(12) United States Patent
Ozai et al.

(10) Patent No.: US 7,563,843 B2
(45) Date of Patent: Jul. 21, 2009

(54) FLAME RETARDANT SILICONE COMPOSITIONS

(75) Inventors: Toshiyuki Ozai, Gunma-ken (JP); Yoshifumi Inoue, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 58 days.

(21) Appl. No.: 10/438,863

(22) Filed: May 16, 2003

(65) Prior Publication Data

US 2003/0220448 A1 Nov. 27, 2003

(30) Foreign Application Priority Data

May 16, 2002 (JP) .............................. 2002-141449

(51) Int. Cl.
*C08L 83/04* (2006.01)
(52) U.S. Cl. ........................ 524/588; 524/188; 524/262; 524/86; 524/87; 524/95; 524/96; 528/15; 528/31; 528/32; 528/38
(58) Field of Classification Search ................. 524/188, 524/262, 588, 86, 87, 95, 96; 528/15, 31, 528/32, 38
See application file for complete search history.

(56) References Cited

U.S. PATENT DOCUMENTS

| 4,371,525 | A | * | 2/1983 | Acker et al. .................. 514/63 |
| 4,536,265 | A | * | 8/1985 | Fabrizio et al. ................ 522/44 |
| 4,649,184 | A | * | 3/1987 | Yoshikawa et al. .......... 526/279 |
| 5,079,300 | A | * | 1/1992 | Dubrow et al. .............. 525/106 |
| 5,391,795 | A | * | 2/1995 | Pickett ........................ 556/436 |
| 5,880,199 | A | | 3/1999 | Matsushita et al. |
| 6,034,225 | A | * | 3/2000 | Weidner et al. ............. 534/730 |
| 6,348,557 | B1 | * | 2/2002 | Barthel et al. .................. 528/34 |
| 6,677,392 | B2 | * | 1/2004 | Ravichandran et al. ....... 524/86 |

FOREIGN PATENT DOCUMENTS

EP 0 801 111 A1 10/1997

OTHER PUBLICATIONS

Back et al., Can. J. Chem. 64 (1986) 308-310.*

* cited by examiner

*Primary Examiner*—Kuo-Liang Peng
(74) *Attorney, Agent, or Firm*—Birch, Stewart, Kolasch & Birch, LLP

(57) ABSTRACT

An amino compound having a secondary amino group directly bonded to a phenyl group is modified by silylating the secondary amino group. When the silylated amino compound is compounded in a silicone composition comprising an organopolysiloxane containing at least two lower alkenyl groups, an organohydrogenpolysiloxane, and a platinum base curing catalyst, the composition is improved in flame retardance to the level of UL-94 V-0 without sacrificing the activity of the curing catalyst.

6 Claims, No Drawings

FLAME RETARDANT SILICONE COMPOSITIONS

TECHNICAL FIELD

This invention relates to silicone compositions which cure into flame retardant parts and are suitable for the protection of ICs and hybrid ICs.

BACKGROUND OF THE INVENTION

A number of techniques are known in the art for rendering flame retardant addition curing silicone rubber compositions which cure into elastomers. The most basic technique is the addition of platinum compounds to organopolysiloxanes. The addition of benzotriazole, hydrazine or the like is also known effective for improving flame retardance.

The compounds having such flame retardant effects known in the art have a secondary amino group (=N—H) directly bonded to a phenyl group. They usually become an inhibitor to the curing catalyst when added to addition curing silicone rubber compositions. These compounds must thus be added in limited amounts, which are often insufficient to achieve a desired level of flame retardance. The compounds can be modified by substituting a methyl group or the like for the hydrogen atom of the secondary amino group to form an N—C bond. The modified compounds are not inhibitory to the curing catalyst, but have inferior flame retardant effects to the compounds having a secondary amino group.

In the field where flame retardance is a basic requirement, prior art silicone compositions failed to meet such requirements. It was then customary in the art to take appropriate means for imparting flame retardance to parts rather than the compositions themselves. However, as the environmental problem recently becomes of great concern, a more strict requirement is imposed on flame retardance. There exists a need for silicone compositions which exhibit excellent flame retardance while maintaining good curing ability.

SUMMARY OF THE INVENTION

It has been found that an amino compound having a secondary amino group directly bonded to a phenyl group can be modified by silylating the secondary amino group and that when the silylated amino compound is compounded in a silicone composition comprising (A) an organopolysiloxane containing at least two lower alkenyl groups, (B) an organohydrogenpolysiloxane, and (C) a platinum base curing catalyst, surprisingly, the composition is improved in flame retardance to the level of UL-94 V-0 without sacrificing the activity of the curing catalyst.

Accordingly, the present invention provides a flame retardant silicone composition comprising (A) 100 parts by weight of an organopolysiloxane containing at least two lower alkenyl groups in a molecule, represented by the following general formula (1):

$$R_a R^1_b SiO_{(4-a-b)/2} \quad (1)$$

wherein R is a lower alkenyl group, $R^1$ is an unsubstituted monovalent hydrocarbon group free of aliphatic unsaturation, "a" is a positive number of 0.0001 to 0.2, "b" is a positive number of 1.7 to 2.2, and the sum of a+b is 1.9 to 2.4, (B) 0.1 to 30 parts by weight of an organohydrogenpolysiloxane containing at least two hydrogen atoms directly bonded to silicon atoms in a molecule, (C) platinum or a platinum compound in an amount to give 0.1 to 1,000 ppm of platinum element based on the weight of the entire composition, and (D) 0.001 to 10 parts by weight of a compound derived from an amino compound having a secondary amino group directly bonded to a phenyl group, by silylating the secondary amino group, said amino compound being selected from the group consisting of benzotriazole, benzimidazole, phenoxazine, N-allylaniline, p-anilinophenol, m-anilinophenol, 2-phenylindole, and 2-anilinoethanol.

The flame retardant silicone composition cures into a rubbery or gel-like product.

DESCRIPTION OF THE PREFERRED EMBODIMENTS

Component (A) serves as a main component or base polymer of the silicone composition according to the invention and is an organopolysiloxane containing at least two alkenyl groups in a molecule. It is of the following general compositional formula (1).

$$R_a R^1_b SiO_{(4-a-b)/2} \quad (1)$$

Herein R is a lower alkenyl group having 2 to 6 carbon atoms, preferably 2 to 4 carbon atoms, such as vinyl, allyl, propenyl, isopropenyl, butenyl or isobutenyl, with vinyl being most preferred. $R^1$ is an unsubstituted monovalent hydrocarbon group free of aliphatic unsaturation, usually having 1 to about 10 carbon atoms, preferably 1 to about 6 carbon atoms, for example, alkyl groups such as methyl, ethyl, propyl, isopropyl, butyl, isobutyl, tert-butyl, pentyl, hexyl, cyclohexyl and octyl, aryl groups such as phenyl and tolyl, aralkyl groups such as benzyl and phenylethyl. Of these, alkyl and aryl groups are preferred, with methyl or phenyl being most preferred for flame retardance. When the organopolysiloxane has groups other than the foregoing groups, for example, halo-substituted hydrocarbon groups (e.g., trifluoropropyl) as a monovalent substituent group bonded to a silicon atom, the desired flame retardance is not achievable. The subscripts "a" and "b" are positive numbers and selected such that organopolysiloxane (A) has at least two R's (alkenyl groups). Specifically, "a" is a positive number of 0.0001 to 0.2, preferably 0.001 to 0.1, "b" is a positive number of 1.7 to 2.2, preferably 1.8 to 2.0, and the sum of a+b is 1.9 to 2.4, preferably 1.95 to 2.05.

The organopolysiloxane (A) may be either of straight chain or branched chain including $RSiO_{3/2}$ units, $R^1 SiO_{3/2}$ units and $SiO_{4/2}$ units. Often desired is a straight-chain diorganopolysiloxane whose backbone consists essentially of repeating diorganosiloxane units and which is blocked with a triorganosiloxy group at either end of its molecular chain.

The organopolysiloxane (A) preferably has a viscosity of about 50 to 100,000 centistokes (cs) at 25° C., more preferably about 100 to 10,000 cs at 25° C. With a viscosity of less than 50 cs, the cured product may become too brittle. An organopolysiloxane with a viscosity of more than 100,000 cs may lose fluidity and become difficult to cast and be given less flame retardance.

It is acceptable to add an organopolysiloxane containing only one alkenyl group in a molecule or an organopolysiloxane free of an alkenyl group to the organopolysiloxane as component (A) to adjust the hardness.

Component (B) is an organohydrogenpolysiloxane which reacts with component (A) and serves as a crosslinking agent. Its molecular structure is not critical, and any of straight, branched, cyclic and three-dimensional network structure (dendritic) manufactured in the art may be used. The organohydrogenpolysiloxane should contain at least two, preferably at least three hydrogen atoms directly bonded to silicon atoms (i.e., hydrosilyl groups represented by SiH) in a molecule. It usually has about 3 to about 500, preferably about 3 to about 200, more preferably about 3 to about 100 SiH groups. The organohydrogenpolysiloxane used herein is typically of the following average compositional formula (2).

  (2)

In formula (2), $R^2$ is an aliphatic unsaturation-free, unsubstituted monovalent hydrocarbon group bonded to a silicon atom, preferably having 1 to 10 carbon atoms. Examples of suitable unsubstituted monovalent hydrocarbon groups represented by $R^2$ include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; and aralkyl groups such as benzyl, phenylethyl and phenylpropyl. Of these, alkyl and aryl groups are preferred, with methyl and phenyl being more preferred for flame retardance. The subscript d is a positive number of 0.7 to 2.1, c is a positive number of 0.001 to 1.0, and the sum of d+c is 0.8 to 3.0. Preferably, d is 1.0 to 2.0, c is 0.01 to 1.0, and d+c is 1.5 to 2.5.

Two or more, preferably three or more SiH groups contained per molecule may be positioned at ends of or midway the molecular chain or both. The molecular structure of the organohydrogenpolysiloxane may be any of straight, branched, cyclic and three-dimensional network structure. For the physical properties of the resulting silicone rubber and ease of handling of the composition, it is recommended to use an organohydrogenpolysiloxane having a number of silicon atoms per molecule (or degree of polymerization) desirably in the range of 2 to about 1,000, more desirably 3 to about 300, even more desirably 4 to about 150. The desired organohydrogenpolysiloxane used herein is liquid at room temperature (25° C.) as demonstrated by a viscosity at 25° C. of about 0.1 to about 5,000 mPa·s, more desirably about 0.5 to about 1,000 mPa·s, even more desirably about 5 to about 500 mPa·s.

Examples of the organohydrogenpolysiloxane of average compositional formula (2) include 1,1,3,3-tetramethyldisiloxane, methylhydrogencyclo-polysiloxane, methylhydrogensiloxane-dimethylsiloxane cyclic copolymers, trimethylsiloxy end-capped methylhydrogenpolysiloxane, trimethylsiloxy end-capped dimethylsiloxane-methylhydrogensiloxane copolymers, dimethylhydrogensiloxy end-capped dimethylpolysiloxane, dimethylhydrogensiloxy end-capped dimethylsiloxane-methylhydrogensiloxane copolymers, trimethylsiloxy end-blocked methylhydrogensiloxane-diphenylsiloxane copolymers, trimethylsiloxy end-capped methylhydrogensiloxane-diphenylsiloxane-dimethylsiloxane copolymers, dimethylhydrogensiloxy end-capped methylhydrogensiloxane-dimethylsiloxane-diphenylsiloxane copolymers, copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, and copolymers consisting of $(CH_3)_2HSiO_{1/2}$ units, $SiO_{4/2}$ units and $(C_6H_5)_3SiO_{1/2}$ units.

Component (B) is preferably added in such amounts that 0.5 to 5.0 moles, more preferably 0.8 to 2.0 moles of silicon atom-bonded hydrogen atoms (i.e., SiH groups) in component (B) are available per mole of silicon atom-bonded alkenyl groups in component (A). A molar ratio (of SiH groups to alkenyl groups) of less than 0.5 equivalent may result in too low a crosslinked density and adversely affect the heat resistance of cured products. A molar ratio of more than 5.0 equivalents may give rise to a problem of foaming due to dehydrogenation reaction and adversely affect the heat resistance of cured products. Numerically stated (in terms of parts by weight), 0.1 to 30 parts by weight of component (B) is used per 100 parts by weight of component (A). It is noted that the total of the average number of hydrogen atoms directly bonded to silicon atoms (i.e., SiH groups) per molecule in component (B) and the average number of alkenyl groups per molecule in component (A) is preferably at least 5. If this total is less than 5, crosslinking into a three-dimensional structure may not take place, resulting unsatisfactory cured products.

Component (C) is platinum or a platinum compound, serving as a catalyst for promoting the addition reaction (hydrosilation) between silicon atom-bonded alkenyl groups in component (A) and silicon atom-bonded hydrogen atoms (i.e., SiH groups) in component (B). Any of well-known catalysts may be used. Examples include platinum black, chloroplatinic acid, alcohol modified products of chloroplatinic acid, complexes of chloroplatinic acid with olefins, aldehydes, vinylsiloxanes and acetylene alcohols. The addition amount is a catalytic amount and may be determined as appropriate in accordance with the desired curing rate. Usually, component (C) is added in such amounts as to give 0.1 to 1,000 ppm, preferably 10 to 200 ppm of platinum element based on the weight of component (A) or components (A) and (B) combined.

Blended for improving flame retardance according to the invention is a compound derived from an amino compound having a secondary amino group directly bonded to a phenyl group, selected from among benzotriazole, benzimidazole, phenoxazine, N-allylaniline, p-anilinophenol, m-anilinophenol, 2-phenylindole, and 2-anilinoethanol, by silylating (specifically triorganosilylating) the secondary amino group.

Although the action of the silylated compound is not well understood, significant effects are ascertained upon evaluation by an actual burning test. The structural formula of a silylated (specifically triorganosilylated) secondary amino group is given by the general formula:

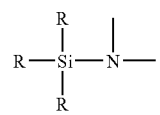

wherein R is independently at each occurrence a substituted or unsubstituted monovalent hydrocarbon group or substituted or unsubstituted alkoxy group.

Examples of R include unsubstituted or halo-substituted monovalent hydrocarbon groups of 1 to 15 carbon atoms, for example, alkyl groups such as methyl, ethyl, propyl, isopropyl, butyl, isobutyl, tert-butyl, pentyl, hexyl, cyclohexyl, 2-ethylhexyl, heptyl, octyl, nonyl and decyl; alkenyl groups such as vinyl, allyl, propenyl, isopropenyl, butenyl, isobutenyl, hexenyl, and cyclohexenyl; aryl groups such as phenyl, tolyl, xylyl and naphthyl; aralkyl groups such as benzyl, phenylethyl and phenylpropyl; substituted ones of the foregoing in which some or all of the hydrogen atoms bonded to carbon atoms are substituted with halogen atoms such as fluorine, chlorine, and bromine, typically halogenated alkyl groups, for example, chloromethyl, bromoethyl, trifluoromethyl, and 3,3,3-trifluoropropyl. Of these, hydrocarbon groups of 1 to 10 carbon atoms, and free of aliphatic unsaturation are preferred. Alkyl and alkoxy groups are more preferred. Of the halo-substituted hydrocarbon groups, functional groups in which hydrogen is partially substituted with halogen such as $CF_3CH_2CH_2$ are preferred.

The triorganosilyl (R₃Si—) groups are typically those groups in which the organic groups (alkyl, alkoxy groups, etc.) bonded to the silicon atom are selected from among lower alkyl and lower alkoxy groups having about 1 to about 4 carbon atoms, specifically trialkylsilyl, alkyldialkoxysilyl, dialkylalkoxysilyl, and trialkoxysilyl groups, such as, for example, trimethylsilyl, triethylsilyl, dimethylethylsilyl, diethylmethylsilyl, propyldimethylsilyl, isopropyldimethylsilyl, butyldimethylsilyl, isobutyldimethylsilyl, tert-butyldimethylsilyl, methyldimethoxysilyl, ethyldimethoxysilyl, methyldiethoxysilyl, ethyldiethoxysilyl, methyldiisopropoxysilyl, methyldi-tert-butoxysilyl, dimethylmethoxysilyl, dimethylethoxysilyl, diethylmethoxysilyl, diethylethoxysilyl, trimethoxysilyl, and triethoxysilyl.

Illustrative examples of the silylated compound include N-(trimethylsilyl)-benztriazole, N-(butyldimethylsilyl)-benzotriazole, N-(dimethylethylsilyl)-benzotriazole, N-(diethylmethylsilyl)-benzotriazole, N-(triethylsilyl)-benzotriazole, N-(trimethylsilyl)-benzimidazole, N-(triethylsilyl)-phenoxazine, N,N-allyl(trimethylsilyl)aniline, 1-(trimethylsilyl)-2-phenylindole, N-(methyldimethoxysilyl)-benzotriazole, N-(ethyldimethoxysilyl)-benzotriazole, N-(methyldiethoxysilyl)-benzotriazole, N-(dimethylmethoxysilyl)-benzotriazole, and N-(trimethoxysilyl)-benzotriazole.

An appropriate amount of component (D) blended is 0.001 to 10 parts by weight, preferably 0.01 to 5 parts by weight per 100 parts by weight of component (A).

In the inventive composition, reinforcing fillers including silica base mineral fillers such as fumed silica, wet process silica powder (precipitated silica) and crystalline silica (ground quartz), and flame retardant assistants such as carbon black, red iron oxide (ferric oxide Fe₂O), cerium oxide, titanium oxide, calcium carbonate, aluminum hydroxide and titanates may be incorporated as an optional component.

The inventive composition will cure at room temperature or under appropriate temperature conditions for a particular application, yielding a silicone rubber or gel endowed with flame retardance.

EXAMPLE

Examples of the present invention are given below by way of illustration and not by way of limitation.

Examples 1-6 and Comparative Examples 1-7

The ingredients shown below were furnished and compounded together to form silicone compositions according to the formulation shown in Tables 1 and 2. The compositions were cured at 120° C. for 60 minutes. The cured products were examined for hardness, flame retardance and curing ability by the methods described below. The results are shown in Tables 1 and 2.

Ingredients:

[A] dimethylpolysiloxane end-capped with a dimethylvinylsiloxy group, having a viscosity of 1,000 cs at room temperature (25° C.)

[B] methylhydrogenpolysiloxane of the average structural formula below, having a viscosity of 120 cs at room temperature (25° C.)

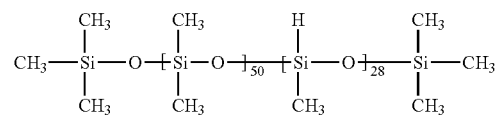

[C] a dimethylpolysiloxane solution of a chloroplatinic acid-vinylsiloxane complex containing 1 wt % of platinum atoms

[D-1] N-(trimethylsilyl)-benzotriazole

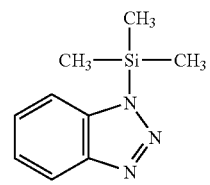

[D-2] N-(trimethylsilyl)-benzimidazole

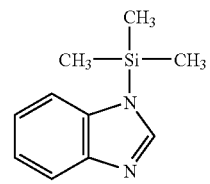

[D-3] N-(diethylmethylsilyl)-benzotriazole

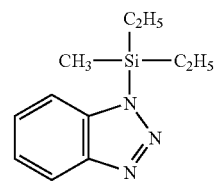

[D-4] N-(trimethylsilyl)phenoxazine

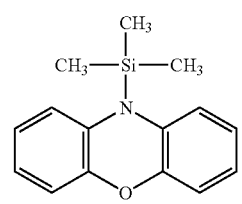

[D-5] N-(methyldimethoxysilyl)-benzotriazole

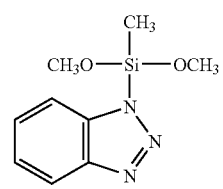

[D-6] benzotriazole
[D-7] benzimidazole
[D-8] phenoxazine
[D-9] N-methylbenzotriazole Hardness was measured using Durometer Type A by Shimadzu Mfg. Co., Ltd. In the flame retardant test, the sheet of 1.5 mm thick obtained under the above curing conditions was cut into bars of 125 mm×13 mm. The test bars were subjected to burning in accordance with the vertical burning test set forth in Underwriters Laboratories, Inc. Bulletin 94 (UL-94), and rated either V-0, V-1 or V-2. The flaming time was measured two times, and the result is an average of 5 specimens.

TABLE 1

| Ingredients (pbw) | Example ① | Example ② | Example ③ | Example ④ | Example ⑤ | Example ⑥ | Comparative Example ① | Comparative Example ② | Comparative Example ③ | Comparative Example ④ |
|---|---|---|---|---|---|---|---|---|---|---|
| A | | | | | 100 | | | | | |
| B | | | | | 6 | | | | | |
| C | | | | | 0.15 | | | | | |
| D-1 | 0.1 | | | | | | 0.01 | | | |
| D-2 | | 0.1 | | | | | | | | |
| D-3 | | | 0.1 | | | | | | | |
| D-4 | | | | 0.1 | | | | | | |
| D-5 | | | | | 0.1 | | | | | |
| D-6 | | | | | | | 0.1 | | | |
| D-7 | | | | | | | | 0.1 | | |
| D-8 | | | | | | | | | 0.1 | |
| D-9 | | | | | | | | | | 0.1 |
| Hardness | 20 | 20 | 20 | 20 | 20 | 20 | 5 | 3 | 4 | 20 |
| Flaming time (sec) 1st | 5 | 8 | 7 | 4 | 6 | 20 | 7 | 5 | 6 | 35 |
| Flaming time (sec) 2nd | 7 | 6 | 8 | 6 | 7 | 7 | 8 | 7 | 2 | 5 |
| Rating | V-0 | V-0 | V-0 | V-0 | V-0 | V-1 | V-0 | V-0 | V-0 | N.G. |

TABLE 2

| Ingredients (pbw) | Comparative Example ⑤ | Comparative Example ⑥ | Comparative Example ⑦ |
|---|---|---|---|
| A | 100 | | |
| B | 6 | | |
| C | 0.15 | | |
| D-6 | 0.01 | | |
| D-7 | | | 0.01 |
| Hardness | 20 | 20 | 20 |
| Flaming time (sec) 1st | 50 | 55 | 100 |
| Flaming time (sec) 2nd | 20 | 25 | 10 |
| Rating | N.G. | N.G. | N.G. |

It is seen that the use of component (D) improves the flame retardance of silicone compositions while maintaining the curing ability thereof.

There have been described silicone compositions comprising a specific flame retardant compound in which the amount of the flame retardant compound added can be increased without sacrificing the curing ability and which cure into products having improved flame retardance. The compositions are thus suited for the protection of ICs and hybrid ICs.

Japanese Patent Application No. 2002-141449 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A flame retardant silicone composition comprising, in admixture:

(A) 100 parts by weight of an organopolysiloxane containing at least two alkenyl groups having 2 to 6 carbon atoms in a molecule, and having a viscosity of 50 to 100,000 centistokes at 25° C., represented by the following general formula (1):

$$R_a R^1_b SiO_{(4-a-b)/2} \quad (1)$$

wherein R is an alkenyl group having 2 to 6 carbon atoms, $R^1$ is an unsubstituted monovalent hydrocarbon group free of aliphatic unsaturation, "a" is a positive number of 0.0001 to 0.2, "b" is a positive number of 1.7 to 2.2, and the sum of a+b is 1.9 to 2.4;

(B) 0.1 to 30 parts by weight of an organohydrogenpolysiloxane containing at least two hydrogen atoms directly bonded to silicon atoms in a molecule, and being of the following average compositional formula (2):

$$R^2_d H_c SiO_{(4-d-c)/2} \quad (2)$$

wherein $R^2$ is an aliphatic unsaturation-free, unsubstituted monovalent hydrocarbon group, the letter "d" is a positive number of 0.7 to 2.1, the letter "c" is a positive number of 0.001 to 1.0, and the sum of d+c is 0.8 to 3.0;

(C) platinum or a platinum compound in an amount to give 0.1 to 1,000 ppm of platinum element based on the weight of the entire composition; and (D) 0.1 to 10 parts by weight of a compound derived from an amino compound having a secondary amino group directly bonded to a phenyl group, by silylating the secondary amino group, said amino compound being selected from the group consisting of benzotriazole, phenoxazine, N-allylaniline and, 2-phenylindole, the silylated secondary amino group having the following general formula:

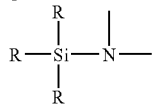

wherein,
the triorganosilyl (R$_3$Si—) group is trimethylsilyl group, butyldimethylsilyl group, dimethylethylsilyl group, diethylmethylsilyl group, triethylsilyl group, methyldimethoxysilyl group, ethyldimethoxysilyl group, methyldiethoxysilyl group, dimethylmethoxysilyl group, or triniethoxysilyl group, and wherein
the cured product of said composition does not have a hardness of 5 or less by Durometer Type A, and has a flame retardance to the level of UL-94 V-0.

2. The flame retardant silicone composition of claim 1 wherein component (D) is a silylated compound selected from the group consisting of: N-(trimethylsilyl)-benzotriazole, N-(butyldimethylsilyl)-benzotriazole, N-(dimethylethylsilyl)-benzotriazole, N-(diethylmethylsilyl)-benzotriazole, N-(triethylsilyl)-benzotriazole, N-(triethylsilyl)-phenoxazine, N,N-allyl(trimethylsilyl)amiline, 1-(trimethylsilyl)-2-phenylindole, N-(methyldimethoxysilyl)-benzotriazole, N-(ethyldimethoxysilyl)-benzotriazole, N-(methyldiethoxysilyl)-benzotriazole, N-(dimethylmethoxysilyl)-benzotriazole, and N-(trimethoxysilyl)-benzotriazole.

3. The flame retardant silicone composition of claim 1 wherein R in component (D) is at least one selected from the group consisting of methyl group, ethyl group, butyl group, methoxy group, and ethoxy group.

4. The flame retardant silicone composition of claim 1 wherein R in component (D) is methyl group, ethyl group, methoxy group, a combination of methyl group and ethyl group, a combination of methyl group and butyl group, a combination of methyl group and methoxy group, a combination of methyl group and ethoxy group, or a combination of ethyl group and methoxy group.

5. The flame retardant silicone composition of claim 1 wherein the amino compound having a secondary amino group directly bonded to a phenyl group is benzotriazole, or phenoxazine.

6. A flame retardant silicone composition comprising, in admixture:

(A) 100 parts by weight of an organopolysiloxane containing at least two alkenyl groups having 2 to 6 carbon atoms in a molecule, and having a viscosity of 50 to 100,000 centistokes at 25° C., represented by the following general formula (1):

$$R_a R^1_b SiO_{(4-a-b)/2} \qquad (1)$$

wherein R is an alkenyl group having 2 to 6 carbon atoms, R$_1$ is an unsubstituted monovalent hydrocarbon group free of aliphatic unsaturation, "a" is a positive number of 0.0001 to 0.2, "b" is a positive number of 1.7 to 2.2, and the sum of a+b is 1.9 to 2.4;

(B) 0.1 to 30 parts by weight of an organohydrogenpolysiloxane containing at least two hydrogen atoms directly bonded to silicon atoms in a molecule, and being of the following average compositional formula (2):

$$R^2_d H_c SiO_{(4-d-c)/2} \qquad (2)$$

wherein R$^2$ is an aliphatic unsaturation-free, unsubstituted monovalent hydrocarbon group, the letter "d" is a positive number of 0.7 to 2.1, the letter "c" is a positive number of 0.001 to 1.0, and the sum of d+c is 0.8 to 3.0;

(C) platinum or a platinum compound in an amount to give 0.1 to 1,000 ppm of platinum element based on the weight of the entire composition; and (D) 0.1 to 10 parts by weight of N-(trimethylsilyl)-benzimidazole, and wherein
the cured product of said composition does not have a hardness of 5 or less by Durometer Type A, and has a flame retardance to the level of UL-94 V-0.

* * * * *